United States Patent [19]
Fujino

[11] Patent Number: 5,331,519
[45] Date of Patent: Jul. 19, 1994

[54] AIMING MECHANISM FOR VEHICLE LAMPS

[75] Inventor: Yuji Fujino, Shimizu, Japan

[73] Assignee: Koito Manufacturing Co., Ltd., Tokyo, Japan

[21] Appl. No.: 47,425

[22] Filed: Apr. 15, 1993

[30] Foreign Application Priority Data

Apr. 17, 1992 [JP] Japan .................. 4-122911

[51] Int. Cl.$^5$ .............. B60Q 1/06; F21V 21/00
[52] U.S. Cl. .................. 362/66; 362/289; 362/428
[58] Field of Search ............ 362/61, 66, 80, 289, 362/419, 372, 430, 428

[56] References Cited

U.S. PATENT DOCUMENTS

| | | | |
|---|---|---|---|
| 4,343,031 | 8/1982 | Liebegott | 362/289 |
| 4,419,721 | 12/1983 | Gregoire et al. | 362/66 |
| 4,471,413 | 9/1984 | Dick | 362/80 |
| 4,621,307 | 11/1986 | Weber | 362/66 |
| 4,674,018 | 6/1987 | Ryder et al. | 362/424 |
| 4,689,725 | 8/1987 | Saijo et al. | 362/66 |
| 4,703,399 | 10/1987 | Van Duyn et al. | 362/66 |
| 4,742,435 | 5/1988 | Van Duyn et al. | 362/66 |
| 4,761,717 | 8/1988 | McMahan et al. | 362/66 |
| 4,839,785 | 6/1989 | Ohishi | 362/61 |
| 4,843,523 | 6/1989 | Nakamura | 362/69 |
| 4,881,152 | 11/1989 | Watanabe et al. | 362/66 |

Primary Examiner—James C. Yeung
Attorney, Agent, or Firm—Sughrue, Mion, Zinn, Macpeak & Seas

[57] ABSTRACT

A vehicle headlamp including a lamp unit coupled to a lamp housing via horizontal and vertical aiming mechanisms each including an aiming screw. At least the horizontal aiming screw is coupled to the lamp unit via a socket seat of flexible material fastened to the back of the lamp unit. The socket seat flexibly carries a socket in which the ball on one end of the horizontal aiming screw is engaged. The flexible socket seat takes up torsional stresses that are exerted on the horizontal aiming screw while this screw is being tightened or loosened for horizontally aiming the headlamp.

9 Claims, 8 Drawing Sheets

AIMING MECHANISM FOR VEHICLE LAMPS

BACKGROUND OF THE INVENTION

This invention relates generally to electric lamps, and particularly to those for use on motor vehicles such as, typically, headlamps. Still more particularly, the invention pertains to improvements in aiming mechanisms for aiming and retaining headlamps or the like in the proper position with respect to the vehicle.

Aimable headlamps may be divided into two broad designs according to the member to be tilted, both vertically and horizontally, for aiming the headlamp. In one such design the complete headlamp unit, including an electric lighting bulb or bulbs, a reflector or reflectors and a lens, is tilted relative to the vehicle or to the lamp housing fixed to the vehicle. The other design is such that only the reflector is tilted relative to the lamp body or the like which is fixed to the vehicle.

In either case, a typical aiming mechanism is composed of a pivotal connection such as a ball-and-socket joint between a tiltable member and a fixed member, and two aiming screws extending between the two members. The relative placement of the pivotal connection and the aiming screws is such that the tightening or loosening of the first of the two aiming screws results in the tilting of the tiltable member about an axis passing through the pivotal connection and the second aiming screw in a plane at right angles with the lamp axis. Similarly, the manipulation of the second aiming screw results in the tilting of the tiltable member about an axis passing through the pivotal connection and the first aiming screw in the same plane as above.

A problem has been encountered with aiming mechanisms of the foregoing general construction, particularly when they are applied to headlamps of horizontally elongated shape which are currently favored in passenger cars. When tightened or loosened, the aiming screws do not move linearly, but arcuately about the noted axis. Such arcuate movement of the aiming screws inevitably imposes torsional stresses thereon. Such torsional stresses can easily cause the deformation or, in the worst case, destruction of the screws themselves or of the parts coupled thereto, either directly or indirectly, because all such parts were fabricated from rigid materials. The deformation of the reflector in particular is highly undesirable as it directly affects the optical performance of the headlamp.

Such deformation or destruction has been more likely to occur with the horizontal aiming screw, which is spaced a greater distance from its axis of arcuate movement than is the vertical aiming screw from its axis when the headlamp is elongated horizontally. The greater this distance is, the travel must the screw travel for tilting the tiltable member through a given angle, and, consequently, the greater is the risk of ruining the screw or other associated parts.

It might be contemplated to make the distances in question as short as possible so that the tiltable member might tilt a desired angle with slight travel of the aiming screws. This solution is objectionable because the screws should be spaced as far away as practical from their axes of the arcuate displacement for the reduction of manual forces required for turning them.

SUMMARY OF THE INVENTION

The present invention seeks in an aimable vehicle lamp of the kind defined, to protect one or both of the aiming screws, and other parts mechanically associated therewith, from deformation or destruction that might occur when the screws are turned for aiming the lamp.

Stated broadly, the invention concerns an aimable vehicle lamp of the type having a tiltable member which is tiltable in every direction relative to a vehicle for aiming the lamp, a first aiming member for tilting the tiltable member relative to the vehicle in a first direction, and a second aiming member for tilting the tiltable member relative to the vehicle in a second direction at right angles with the first direction. Characteristically, the invention provides at least one flexure seat of flexible material flexibly affixed to the tiltable member. At least one of the first and the second aiming members is operatively coupled to the flexure seat, instead of being coupled directly to the tiltable member.

The aiming members take the form of horizontal and vertical aiming screws in a typical embodiment of the invention. In horizontally elongated headlamps, the horizontal aiming screw is at a greater distance from the axis of its arcuate travel than is the vertical aiming screw from its axis. Only the horizontal aiming screw may therefore be coupled via the flexure seat to the tiltable member such as a lamp unit which is tiltable relative to a vehicle part such as a lamp housing, although the vertical aiming screw might be likewise coupled to the tiltable member as required.

The flexure seat serves the purpose of taking up the torsional stresses that are exerted on the horizontal aiming screw as the same is tightened or loosened for horizontally aiming the headlamp. The horizontal aiming screw and other parts associated therewith, notably including the reflector forming a part of the lamp unit, can thus be protected from deformation or destruction. Moreover, relieved of the torsional stresses, the horizontal aiming screw can be turned with less manual force than heretofore.

Preferably, the horizontal aiming screw should be coupled to the flexure seat via a ball and socket joint. The aiming screw may therefore be provided with a ball on its end, and a socket may be mounted to the flexure seat for engagement with the ball. The invention provides the flexure seat and the socket which are both well calculated to perform the purposes for which they are intended, and for the ease of assemblage.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

General

Figure 1:
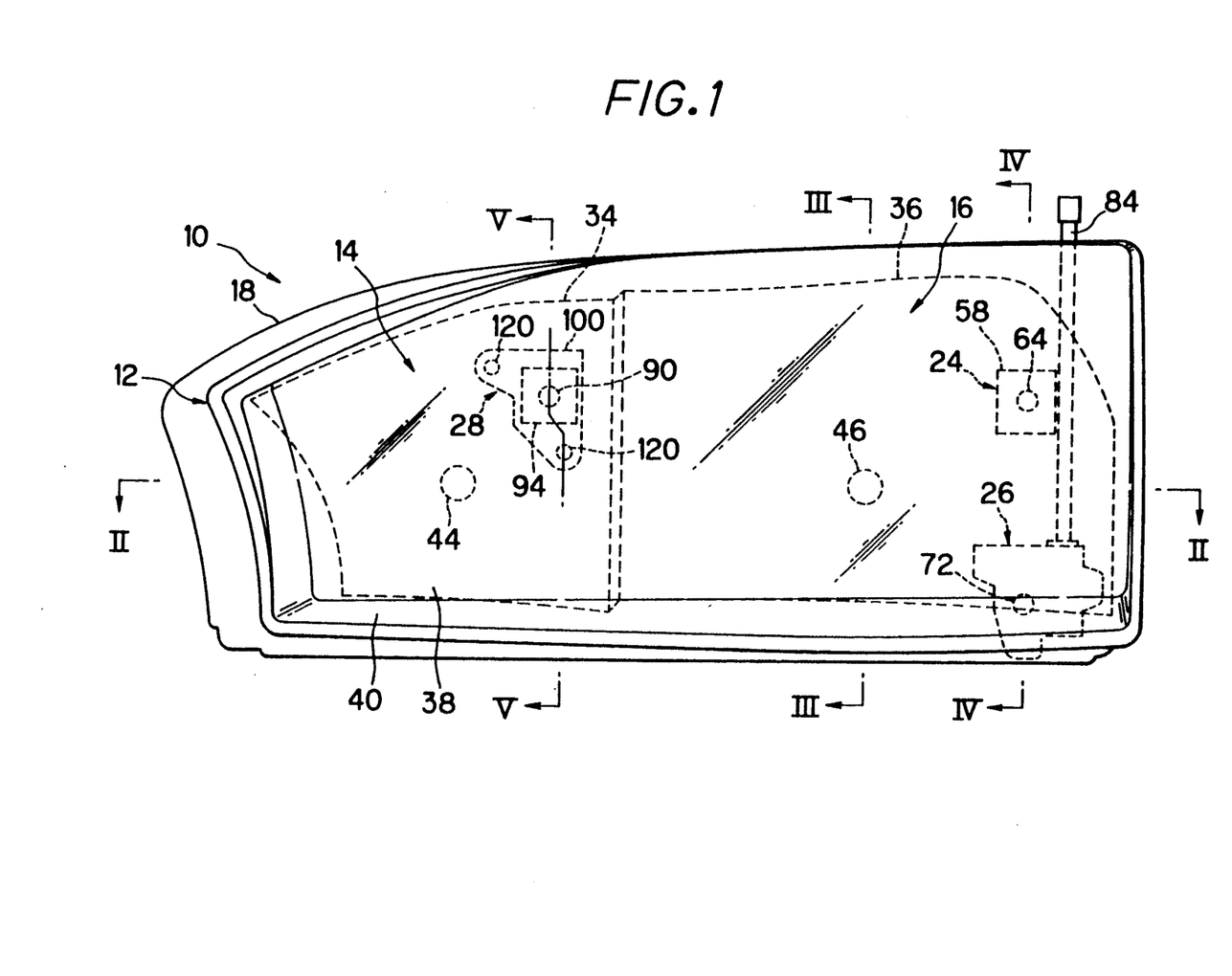
FIG. 1 is a front elevation of an aimable motor vehicle headlamp embodying the principles of this invention.
Figure 2:
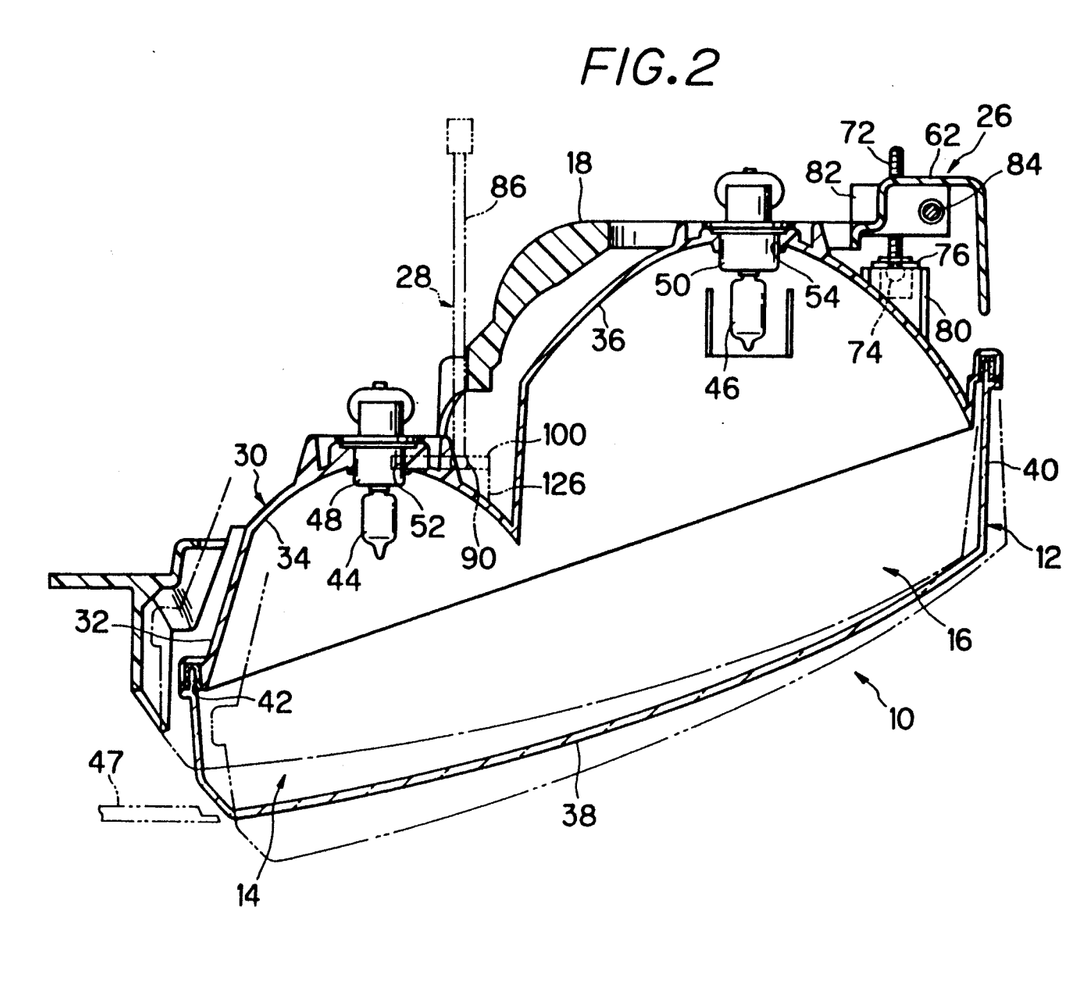
FIG. 2 is a horizontal section through the headlamp, taken along the line II—II in FIG. 1.

The invention will now be described in detail as embodied in a vehicle headlamp of the type in which the complete headlamp unit, rather than the reflector alone, is pivoted both horizontally and vertically for aiming the headlamp relative to the motor vehicle. With reference to FIGS. 1 and 2 the illustrated aimable headlamp 10 has a lamp unit 12 of dual beam design having a high beam section 14 and a low beam section 16. As seen in a front view as in FIG. 1, the lamp unit 12 is substantially in the shape of a rectangle, elongated horizontally.

FIGS. 1–5 all show a lamp housing 18 of one-piece plastic molding which is secured to the motor vehicle having a lamp garnish 20 and a hood 22. Partly received in this lamp housing 18, the dual beam lamp unit 12 is coupled thereto via a pivotal connection 24 (FIGS. 1 and 4), a vertical aiming mechanism 26 (FIGS. 1, 2, 4 and 6), and a horizontal aiming mechanism 28 (FIGS. 1 and 5–8).

As best indicated in FIG. 1, the pivotal connection 24 is positioned adjacent the top, right hand corner, as viewed in this figure, of the lamp unit 12. The vertical aiming mechanism 26 is spaced downwardly, and the horizontal aiming mechanism 28 leftwardly, from the pivotal connection 24. It will be noted that the horizontal aiming mechanism 28 is at a greater distance from the pivotal connection 24 than is the vertical aiming mechanism 26. Therefore, in this particular embodiment, only the horizontal aiming mechanism 28 is built in accordance with the novel concepts of the present invention.

The following is a more detailed discussion of the lamp unit 12, pivotal connection 24, vertical aiming mechanism 26, and horizontal aiming mechanism 28, in that order and under separate headings. The operational description of the headlamp 10, particularly of the horizontal aiming mechanism 28, will follow the discussion of the listed components.

Lamp Unit

Figure 3:
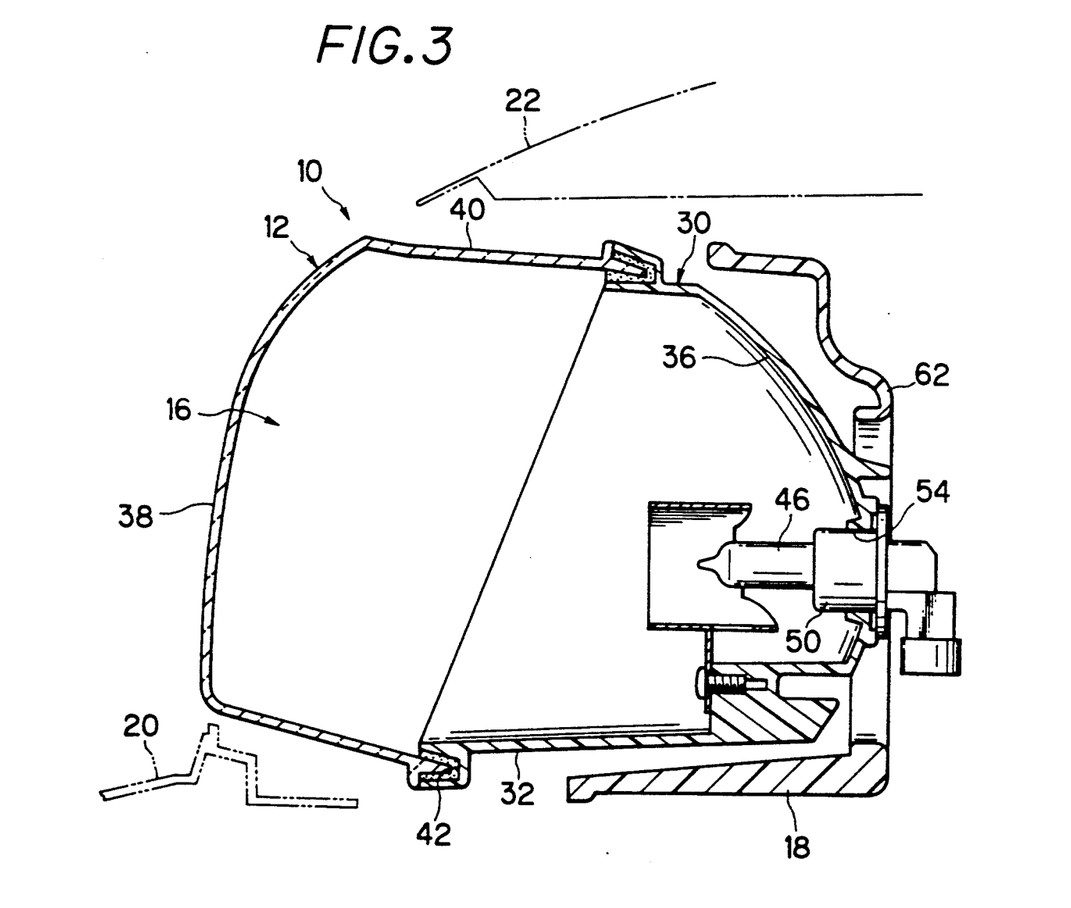
FIG. 3 is a vertical section through the headlamp, taken along the line III—III in FIG. 1.
Figure 4:
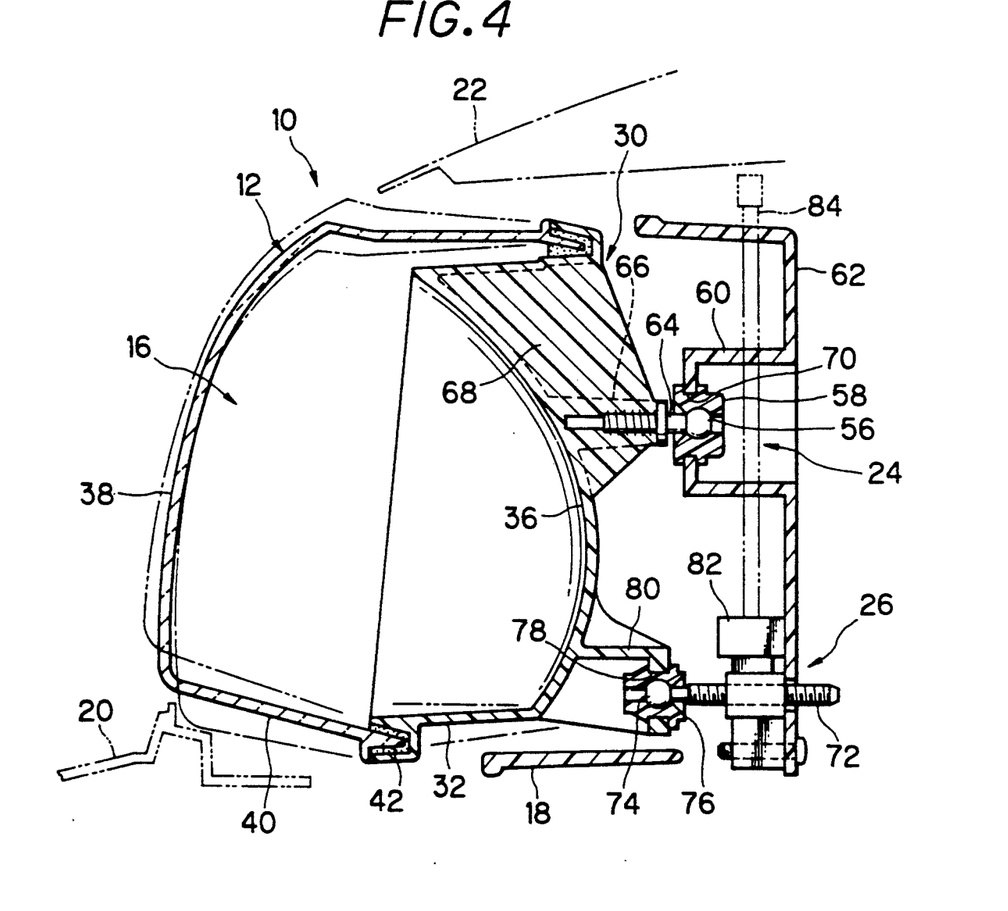
FIG. 4 is another vertical section through the headlamp, taken along the line IV—IV in FIG. 1.
Figure 5:
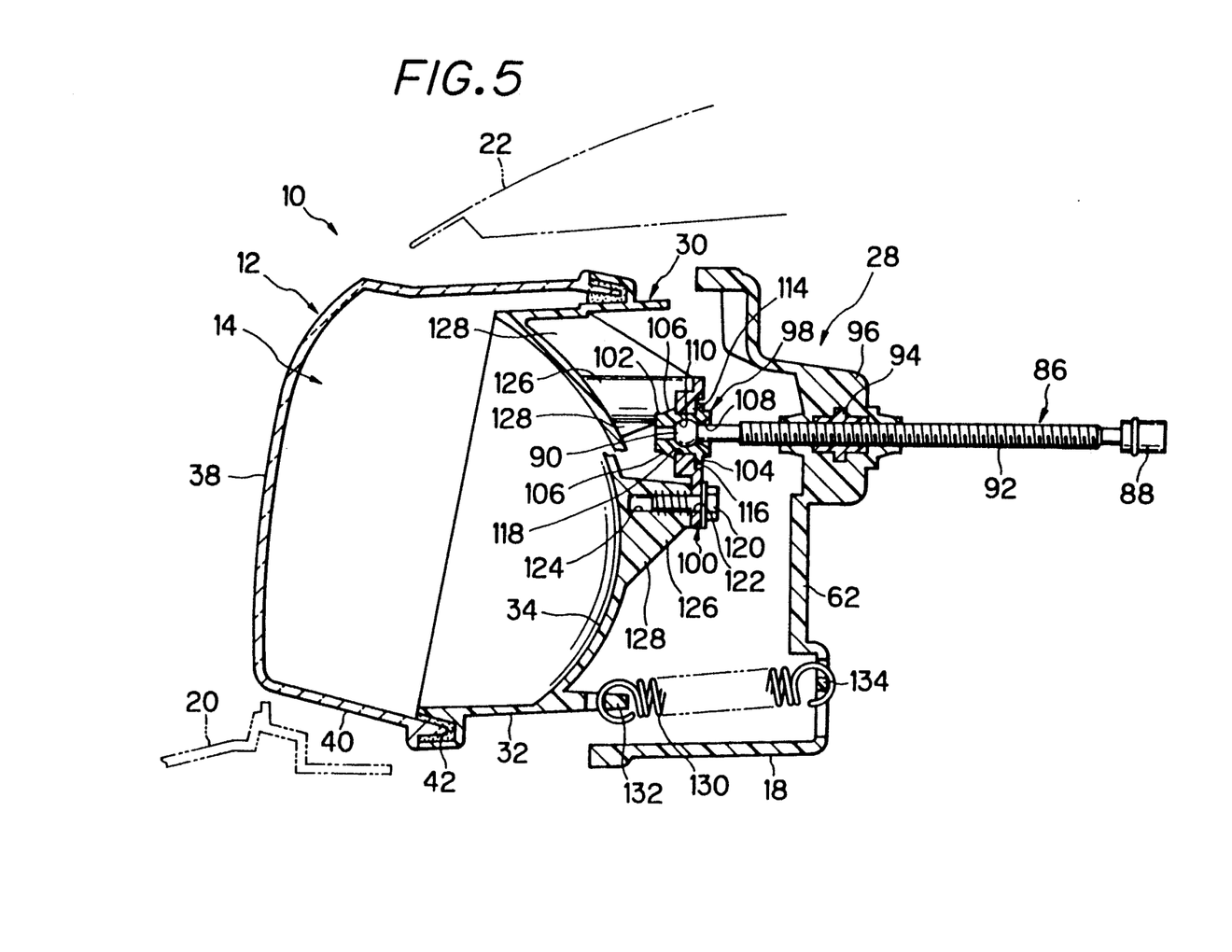
FIG. 5 is still another vertical section through the headlamp, taken along the line V—V in FIG. 1.

As shown in FIGS. 2–6, the dual beam lamp unit 12 has a lamp body 30 including a tubular front portion 32, shown directed to the left is in FIGS. 3–5, and two paraboloidal reflectors 34 and 36 at the back of the front portion 32. The complete lamp body 30, including various appendages thereof to be set forth presently, is molded from BMC or like is relatively rigid plastics. Closing the front end of the front portion 32 of the lamp body 30 is a lens 38 which is molded from a transparent plastic to include an annular peripheral flange 40 engaged in an annular groove 42 in the lamp body.

Two electric lighting bulbs 44 and 46 are mounted to the lamp body 30 by having their bases 48 and 50 received in mounting holes 52 and 54 in the lamp body. The bulb 44 and the reflector 34 make up the high beam section 14, and the bulb 46 and the reflector 36 the low beam section 16.

Pivotal Connection

FIG. 4 best reveals the pivotal connection 24 between lamp unit 12 and lamp housing 18. The connection 24 is a ball-and-socket joint comprising a ball 55 on the lamp body 30 and a socket 58 on a mount 60 formed on the back wall 62 of the lamp housing 18.

Figure 6:
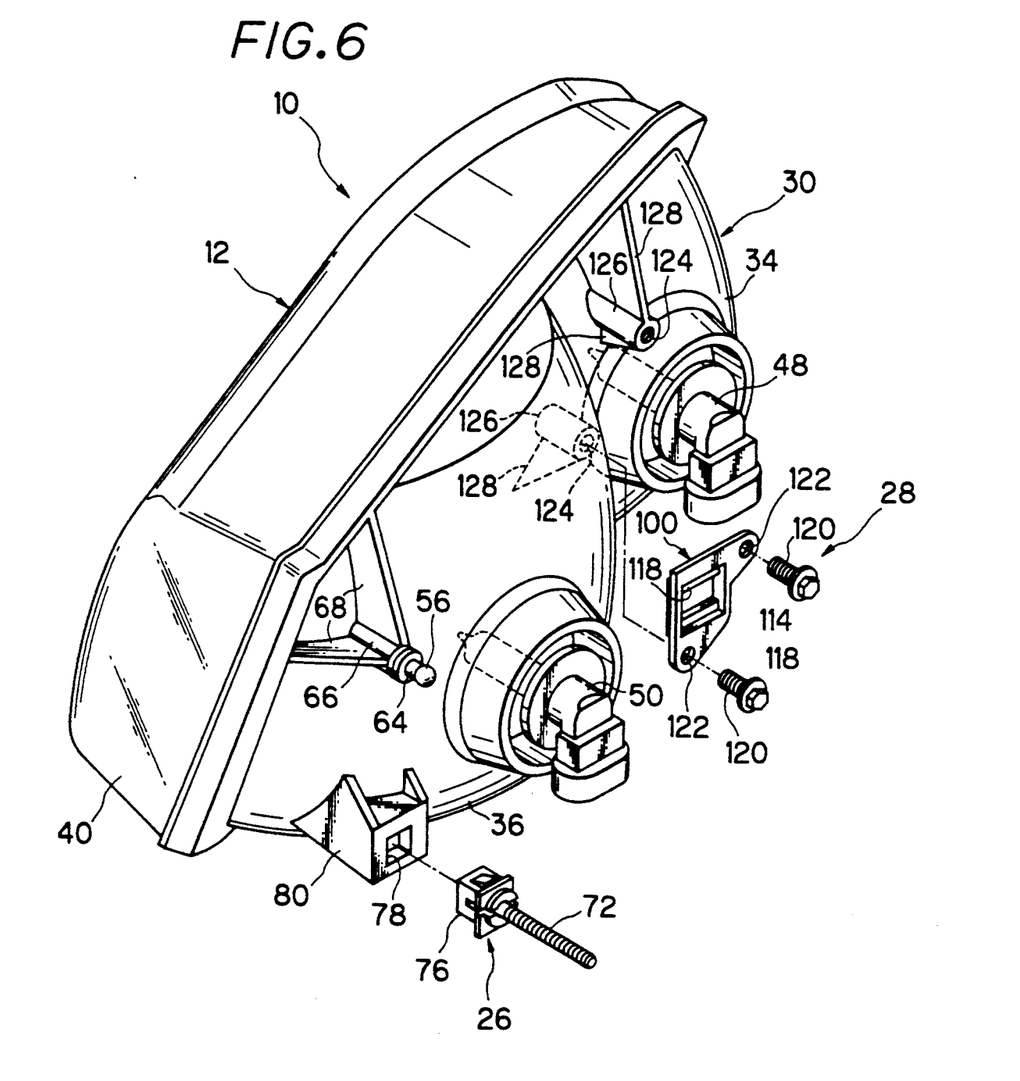
FIG. 6 shows in perspective the rear side of the headlamp, with parts shown disassembled for clarity.

As shown also in FIG. 6, the ball 56 forms the head of a screw 64 which is anchored to a boss 66 on the back of the lamp body 30. The boss 64 is reinforced with ribs 68. The ball 56 is rotatably engaged in the socket 58 which is firmly received in a hole 70 in the mount 60. Thus the lamp unit 12 is pivotable in every direction within limits relative to the lamp housing 18.

Vertical Aiming Mechanism

The vertical aiming mechanism 26 appears in FIGS. 1, 2, 4 and 6. It includes a screw 72 terminating in a ball 74 rotatably engaged in a socket 76. This socket is firmly engaged in a hole 78 in a mount 80 formed on the back of the lamp body 30 in one piece therewith.

The vertical aiming screw 72 extends through a tapped hole in a worm wheel, not shown, which is rotatably mounted within a gear housing 82 secured to the back wall 62 of the lamp housing 18. It is understood that the vertical aiming screw 72 is locked against rotation relative to the unshown worm wheel.

At 84 in FIGS. 1, 2 and 4 is seen an upstanding stud rotatably supported by the lamp housing 18. This stud has nonrotatably mounted thereon a worm, not shown, which is rotatably received within the gear housing 82 and which is meshed with the worm wheel.

Thus, with the manual rotation of the stud 84, the unshown worm wheel will rotate within the gear housing 82. The rotation of the worm wheel will result in turn in the axial movement of the vertical aiming screw 72 and, consequently, in the pivotal movement of the complete lamp unit 12 relative to the lamp housing 18 about a horizontal axis passing through the pivotal connection 24 and the horizontal aiming mechanism 28.

Horizontal Aiming Mechanism

Figure 7:
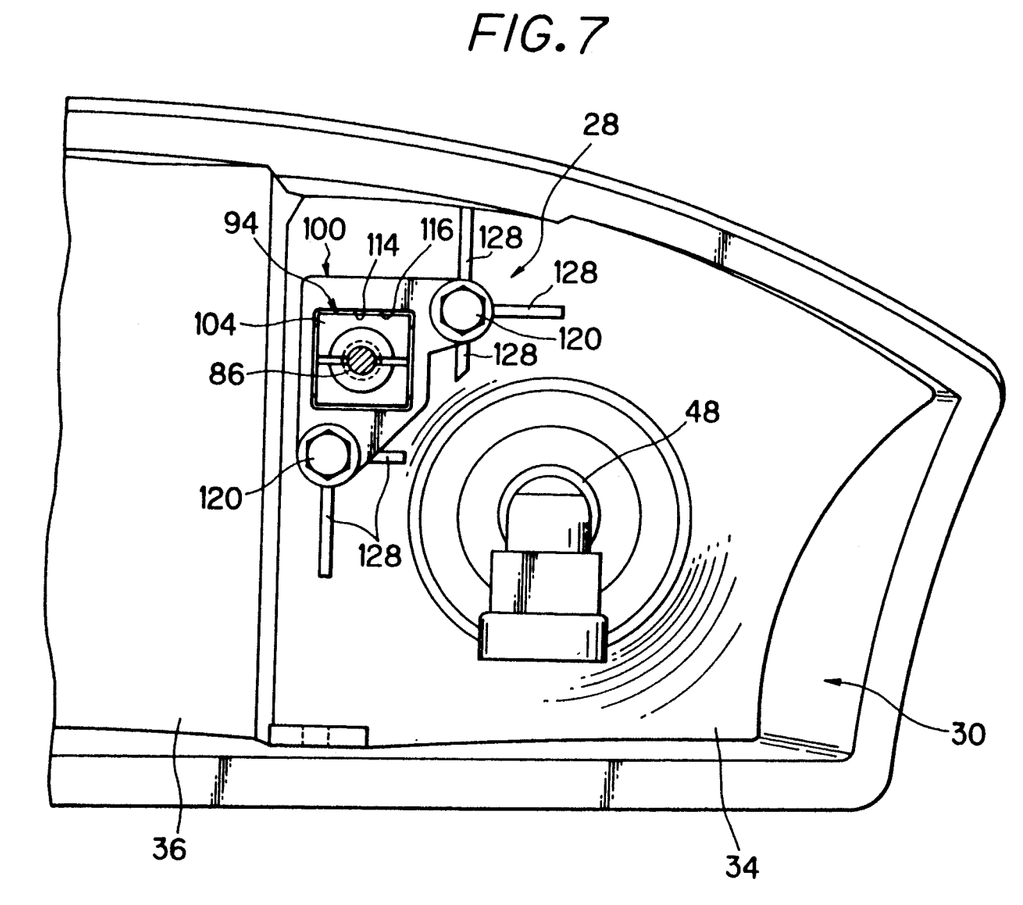
FIG. 7 is an enlarged, partly broken away, rear elevation of the headlamp.
Figure 8:
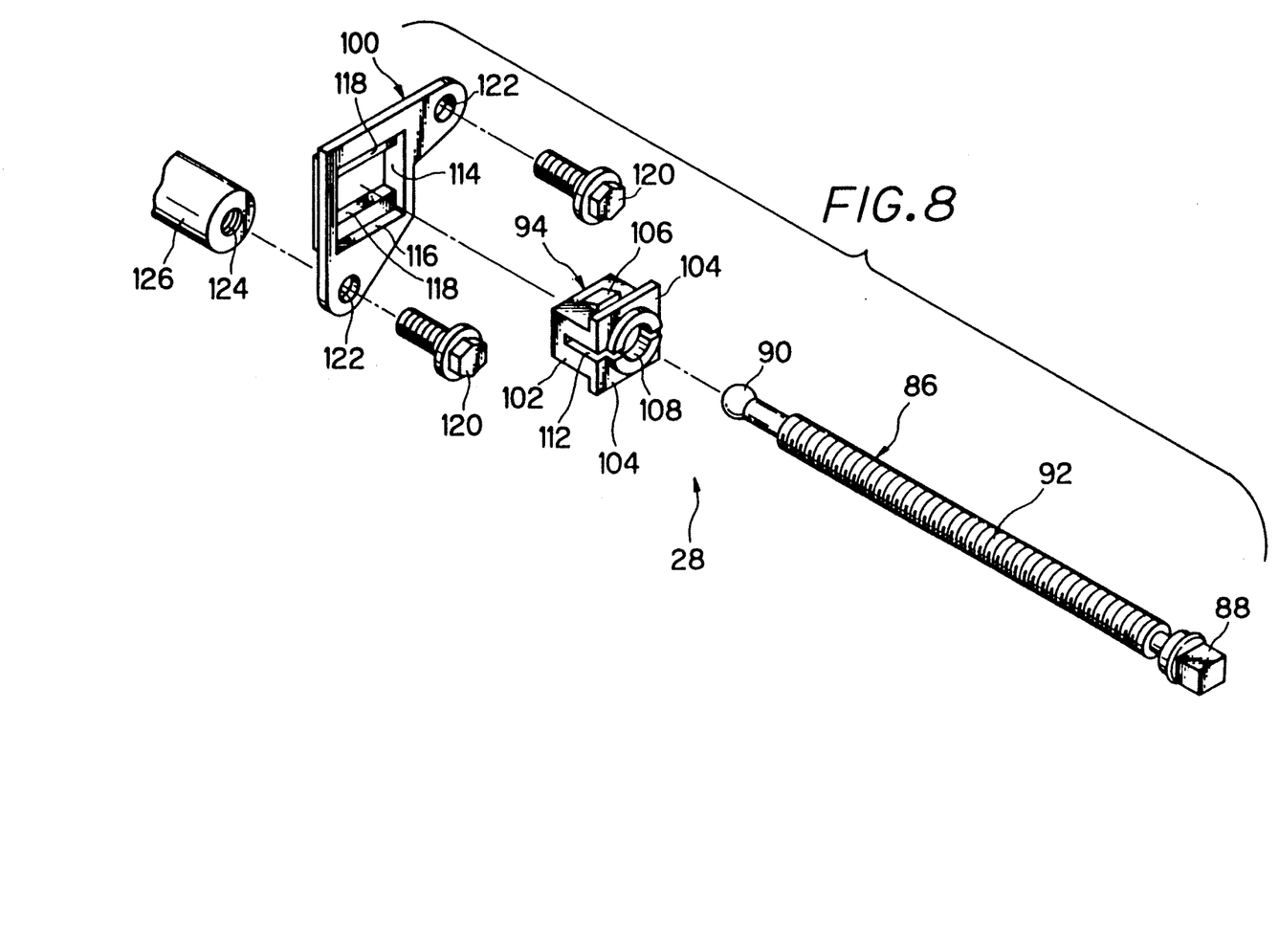
FIG. 8 is an enlarged, exploded perspective view of the horizontal aiming mechanism.

The horizontal aiming mechanism 28 is shown in place on the headlamp 10 in FIGS. 1, 5, 6 and 7 and by itself and in exploded perspective in FIG. 8. A principal part of the horizontal aiming mechanism 28 is a screw 86 terminating at one end in a square head 88 and at the other in a ball 90. FIG. 5 indicates that the threaded shank 92 of the horizontal aiming screw 86 extends through a tapped hole in a self-locking nut 94 of nylon or like material mounted fast to a boss 96 on the back wall 62 of the lamp housing 18. Thus the rotation of the horizontal aiming screw 86 relative to the nut 94 results in the axial travel of the screw with respect to the lamp housing 18.

The ball 90 on the front end of the horizontal aiming screw 86 is rotatably received in a snap-on socket member 98 which is mounted to a flexible socket seat 100 on the back of the lamp body 30. The flexible socket seat 100 constitutes a feature of this invention. The snap-on socket member 98 is so named because it can be snapped into position on the flexible socket seat 100 according to another feature of the invention, as will be detailed subsequently.

As best pictured in FIGS. 5 and 8, the snap-on socket member 98 has a generally rectangular body 102 molded in one piece with a pair of flanges 104 extending in opposite directions from its rear end, and with a pair of wedge-shaped hooks 106 spaced forwardly from the flanges 104. A hole 108 extending through the body 102 of the socket member 98 has a socket 110 in its midportion for rotatably receiving the ball 90 of the horizontal aiming screw 86. The socket member body 102 has also formed therein a slit 112 extending forwardly from its rear end and terminating short of its front end.

FIGS. 7 and 8 best illustrate the construction of the flexible socket seat 100. Molded from a plastic such as acetal resin (polyacetal) into the shape of a generally flat, right angular triangle, the socket seat 100 has a thickened portion 114 of approximately square shape through which is formed an opening 116 of the same shape and slightly smaller size. The top and bottom edges of the opening 116 has a pair of rims 118, FIGS. 5 and 8, formed on the front side of the socket seat 100 and extending in parallel spaced relation to each other.

The flexible socket seat 100 of the foregoing construction is mounted fast to the back of the lamp body 30 by two screws 120 inserted in and through clearance holes 122 in the socket seat and engaged in tapped holes 124 in bosses 126 formed in one piece with the lamp body. The bosses 126 are reinforced by ribs 128 which also are integral with the lamp body 30. The clearance holes 122 are positioned adjacent the two acute corners of the socket seat 100, and the opening 116 adjacent the right angular corner of the socket seat.

Being slitted at 112, the body 102 of the snap-on socket member 94 can be slid into the opening 116 in the socket seat 100 from its rear side by manually compressing the rear end portion of the socket member body. Once received in the socket seat opening 116 as shown in FIG. 5, the socket member 94 will firmly engage the pair of parallel rims 118 of the socket seat 100 between the pair of flanges 104 and pair of hooks 106 practically against any accidental detachment therefrom.

Seen at 130 in FIG. 5 is a helical tension spring extending between a spring retainer 132 on the back of the lamp body 30 and a hook 134 on the lamp housing 18. Disposed just under the horizontal aiming mechanism 28, the tension spring 130 pulls the lamp unit 12 toward the lamp housing 18 in order to prevent loosening of the lamp unit.

Operation

For vertically aiming the headlamp 10, the stud 84, FIGS. 1 and 4, of the vertical aiming mechanism 26 may be rotated in either direction. The bidirectional rotation of the stud 84 will be translated by the unshown worm gearing into the axial movement of the vertical aiming screw 72 back and forth relative to the lamp housing 18. The complete lamp unit 12 will then tilt about an axis passing through the center of the ball 56, FIG. 4, of the pivotal connection 24 and the center of the ball 90, FIG. 5, of the vertical aiming mechanism 28. Thus the aim of the lamp unit 12 is adjustable vertically.

The tightening or loosening of the horizontal aiming screw 86, on the other hand, will result in its axial travel back and forth relative to the nut 94, FIG. 5, embedded in the lamp housing 18. The ball 90 on the front end of the horizontal aiming screw 86 will then push or pull the socket member 94 and, via its flexure seat 100, the lamp body 30, thereby causing the complete lamp unit 12 to tilt about an axis extending through the center of the ball 56 of the pivotal connection 24 and the center of the ball 74, FIG. 4, of the vertical aiming mechanism 26. The aim of the lamp unit 12 is therefore adjustable horizontally.

Moving axially as above, the horizontal aiming screw 86 in particular will encounter torsional stresses from the horizontal tilting of the lamp unit 12. Such torsional stresses will be taken up by the flexible socket seat 100 thereby protecting the horizontal aiming screw 86, reflector 34 and other parts coupled to the screw, either directly or indirectly, from deformation or destruction. Although itself fabricated from flexible material, the socket seat 100 has its flexibility further enhanced by its triangular shape having the two acutely angled corners screwed to the lamp body.

Not withstanding the foregoing detailed disclosure, it is not desired that the present invention be limited by the exact details of the illustrated embodiment. For example, not only the horizontal aiming screw 86 but also the vertical aiming screw 72 can be coupled to the lamp body via a flexible socket seat or any equivalent means. It is also understood that the invention is applicable not only to vehicle lamps having a tiltable lamp unit but also to those in which only the reflector is tilted for aiming.

A variety of additional modifications, alterations or adaptations of the illustrated embodiment will suggest themselves to one skilled in the art, in order to conform to design preferences or to meet the requirements of each specific application of the invention, without departure from the proper scope or fair meaning of the subjoined claims.

What is claimed is:

1. In an aimable vehicle lamp of the type having a tiltable member which is tiltable in every direction relative to a vehicle for aiming the lamp, a first aiming member for tilting the tiltable member relative to the vehicle in a first direction, and a second aiming member for tilting the tiltable member relative to the vehicle in a second direction at right angles with the first direction, the improvement comprising at least one flexure seat of flexible material flexibly affixed to the tiltable member, at least one of the first and the second aiming members being coupled to the tiltable member through the flexure seat whereby torsional stresses exerted on said aiming members during the tilting of the tiltable member are taken up by the flexure seat.

2. In an aimable vehicle lamp of the type having a tiltable member which is tiltable in every direction relative to a vehicle for aiming the lamp, a first aiming screw for tilting the tiltable member relative to the vehicle in a first direction, and a second aiming screw for tilting the tiltable member relative to the vehicle in a second direction at right angles with the first direction, the improvement comprising:
    (a) a socket seat of flexible material flexibly mounted to the tiltable member;
    (b) a socket carried by the socket seat; and
    (c) a ball formed at one end of one of the first and the second aiming screw and rotatably engaged in the socket;
    (d) whereby torsional stresses exerted on said one aiming screw during the tilting of the tiltable member are taken up by the socket seat.

3. The vehicle lamp of claim 2 further comprising:
    (a) a pair of bosses formed on the tiltable member; and
    (b) a pair of fastener elements for fastening the socket seat to bosses on the tiltable member.

4. The vehicle lamp of claim 3 wherein the socket seat generally flat and substantially triangular in shape, and wherein the fastener elements fasten two selected corners of the socket seat to the bosses on the tiltable member.

5. The vehicle lamp of claim 2 wherein the socket seat is generally flat and has an opening formed therein, and wherein the socket is adapted to be snapped into position on the socket seat by being engaged in the opening therein.

6. An aimable vehicle headlamp comprising:
   (a) a lamp housing;
   (b) a lamp unit having a lamp body;
   (c) a pivotal connection between the lamp housing and the lamp body;
   (d) a first aiming mechanism acting between the lamp housing and the lamp body for tilting the lamp unit relative to the lamp housing in a first direction;
   (e) a second aiming mechanism acting between the lamp housing and the lamp body for tilting the lamp unit relative to the lamp housing in a second direction at right angles with the first direction, the second aiming mechanism comprising an aiming screw having a ball on one end thereof;
   (f) a socket seat of flexible material flexibly mounted to the lamp body; and
   (g) a socket carried by the socket seat and operatively engaged with the ball of the aiming screw;
   (h) whereby torsional stresses exerted on the aiming screw during the tilting of the lamp unit are taken up by the socket seat.

7. The vehicle headlamp of claim 6 wherein the socket seat is generally flat and substantially triangular in shape, and wherein the socket seat is fastened at two selected corners thereof to the lamp body.

8. The vehicle headlamp of claim 7 wherein the two selected corners of the socket seat are fastened respective bosses formed on the lamp body.

9. The vehicle headlamp of claim 7 wherein the socket seat has an opening formed therein, and wherein the socket is adapted to be snapped into position on the socket seat by being engaged in the opening therein.

* * * * *